Aug. 23, 1966   A. B. CAREL ET AL   3,267,647
VAPOR PHASE CHROMATOGRAPHY SYSTEM
Filed July 15, 1963   3 Sheets-Sheet 1

INVENTORS
ALFRED B. CAREL &
GEORGE A. BROWN
BY David P. Cullen
ATTORNEY

Aug. 23, 1966 A. B. CAREL ET AL 3,267,647
VAPOR PHASE CHROMATOGRAPHY SYSTEM
Filed July 15, 1963 3 Sheets-Sheet 2
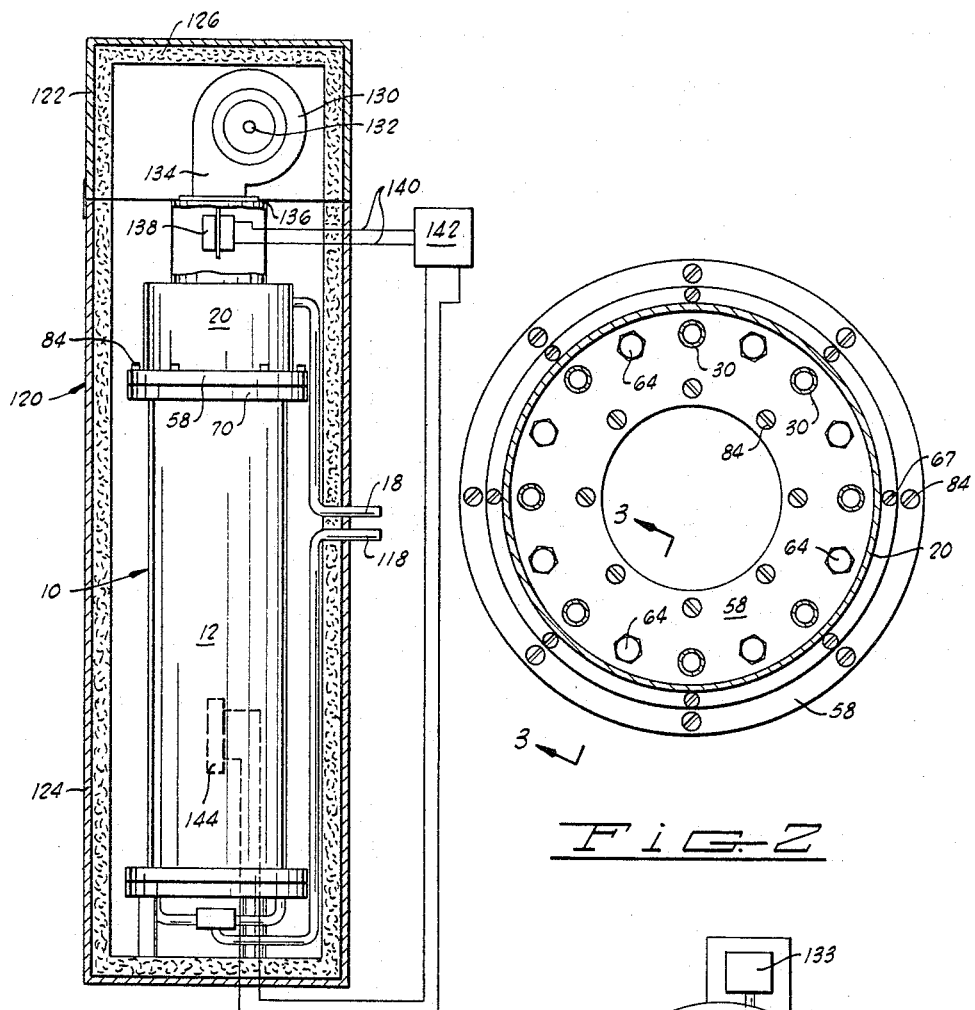
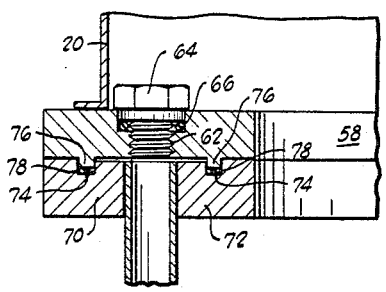
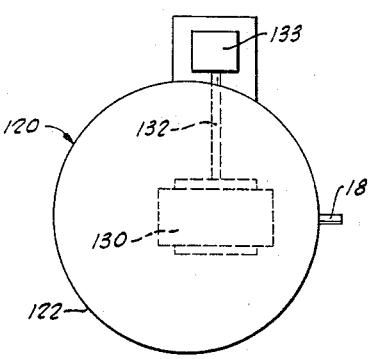
INVENTORS
ALFRED B. CAREL &
GEORGE A. BROWN
BY David P. Cullen
ATTORNEY 3,267,647
VAPOR PHASE CHROMATOGRAPHY SYSTEM
Alfred B. Carel and George A. Brown, Ponca City, Okla.,
assignors to Continental Oil Company, Ponca City,
Okla., a corporation of Oklahoma
Filed July 15, 1963, Ser. No. 295,108
21 Claims. (Cl. 55—197)

This invention relates to the resolution of mixtures of vapors or gases into their several individual molecular species according to the partition coefficients of the several individual components of the mixture in a liquid, or according to the relative adsorptivity of the components of the mixture upon certain solid adsorbent materials. More particularly, but not by way of limitation, this invention relates to preparative vapor phase chromatographic apparatus for isolating from a mixture of gaseous compounds a particular compound which it is desired to recover in a relatively high state of purity and in good yield.

Vapor phase or gas chromatography is a now widely used technique for separating the constituents of a vaporous mixture in which the mixture is passed through a column containing a solid gas adsorption material, or a pervious material substrate carrying a suitable liquid which varies in its affinity for the several compounds in the vapor mixture. Vapor phase chromatography may be used as an analytical technique for analyzing the vaporous mixture to determine the quality and quantity of its several components, or it may be used as a preparative technique in which one or more of the components is recovered in good yield and high purity.

One of the types of chromatographic columns recently used for preparative purposes with good results is an annular chromatographic column comprising a pair of concentric cylindrical wall members which define between them an annular space in which is located the column packing. The packing may consist of some type of solid material upon which the components of the gaseous mixture are selectively adsorbed, or it may consist of a pervious material, such as subdivided firebrick or diatomaceous earth, coated with a liquid or so-called developer in which the components of the gaseous mixture are retained during passage through the column according to the differing degrees of affinity of the liquid for the several components or, stated differently, according to the different partition coefficients of the components in the liquid. As is well-known, those components of the gaseous mixture which are less strongly adsorbed or for which the separation material of the packing displays less affinity are the first to be eluted from the chromatographic column, and those which are more strongly adsorbed or bound to the separation material are later eluted and thereby separated from the initially eluted components. Where a chromatographic column is employed for preparative purposes, a relatively large sample of the gaseous mixture is injected into the column and the component which it is desired to recover is isolated from the other components of the mixture by suitable techniques, such as trapping it in a cold trap which is positioned in the effluent stream from the column at the time that the particular component of interest is discharged therefrom. Other recovery techniques are well known in the art.

The annular chromatographic column to which reference has been made is especially useful in preparative chromatography in that the annular geometric configuration of the column permits a much larger sample to be passed through the column in a shorter time than say in the case of a long tubular column and thus larger amounts of the pure components to be recovered per unit time. Other preparative chromatography advantages will also be acknowledged by those skilled in the art to characterize the annular chromatographic column as opposed to a tubular column of the type more widely used in analytical chromatography. However, several difficulties are generally experienced in the use of the annular type of chromatographic column, and certain methods of usage of these columns have heretofore resulted in less than optimum recoveries of the pure components sought. Thus, for example, the previous annular chromatographic columns known to applicants have been operated by introducing the gaseous sample to the column at a single point or area on one side of the annular column and withdrawing the resolved, eluted components from the lower end of the column, also at a single point or small area on one side of the annular column. This procedure results in an uneven distribution of the sample in the annular space occupied by the packing of the column, and an uneven withdrawal of components from the column. In other words, an even frontal movement of the entire sample, and of identical resolved components through the column from the top to the bottom thereof is not obtainable with sample introduction and removal accomplished in the manner described. Therefore, the purity of components recovered from the column is less than optimum as a result of contamination by some components which are permitted by geometrically uneven introduction to advance through the column out of the order dictated by the natural separatory effect of the column.

Another difficulty which has confronted the user of annular chromatographic columns in preparative chromatography is the difficulty in achieving a uniform temperature throughout the column and particularly across the column in a radial direction. This difficulty is particularly significant when it is desirable or necessary to apply heat to the column to aid, or bring about, the desired separation, either by retaining the sample in its gaseous state as it is passed through the column, or for the purpose of changing the relative affinities of the several constituents of the mixture for a particular liquid developer. Although heat may be fairly evenly applied over the length of the annular chromatographic column, it has heretofore been extremely difficult to attain a satisfactorily uniform temperature across the radial dimension of the annulus defined between the walls of the column. Moreover, in some instances where heating coils of the RF or resistance type are employed, and are positioned around the outside of the column, as well as along the inside wall thereof, the proximity of these heating elements results in the development of hot spots within the column at points opposite the heating elements, which hot spots, of course, detrimentally affect the separation of the gaseous components within the column and the even frontal movement of components through the column.

Yet another difficulty which has been characteristic of the use of annular chromatographic columns of the type described is the problem encountered in changing or replacing the packing contained in the annulus between the concentric walls of such columns. In most instances, limited access to the annulus is available and the packing must be introduced to the column through such limited access openings or apertures. As a result of this method of packing the column, the packing frequently is not uniformly and evenly located in the annulus and the gaseous mixture to be separated by the column must pass through a larger amount of packing material at some points around the annulus of the column than must be traversed at other points. Again, the ultimate result is uneven rates of passage of the several components of the mixture through the column at different points around the annular space and therefore a reduction in the degree of resolution which can be obtained using the column, and in the purity of the components which are recovered. Moreover, the provision of limited access to the annulus of the annular chromatographic column necessitates a tedious and extended job in removing the packing from, and replacing it in, the column.

The present invention comprises a vapor phase chromatography system in which the vapor sample is fed uniformly and evenly to an annular chromatographic column by introducing the sample to the upper end of the column annulus at a plurality of points circumferentially spaced around the annulus. Also, the sample is more uniformly and evenly removed from the column than in previous systems using such annular columns in that a plurality of conduits are used to carry the sample from a plurality of points spaced around the bottom of the column to an effluent collection manifold where the samples are collected in a common chamber. Since the intake and discharge conduits are, in each case, of equal length in their extent between the column and sample intake manifold and effluent collection manifold, respectively, the sample which is charged to the column, and particularly, the effluent which is collected, are not split into several differing overlapping increments as a result of shorter paths of flow to or from a common manifold and conduit.

The present invention also provides certain improvements in the facility with which the packing material may be introduced to the annulus of an annular vapor phase chromatographic column so that renewal or replacement of the packing, as well as the initial packing of the column, is much more easily accomplished.

Another feature of the chromatographic system of the present invention is the manner in which the annular chromatographic column is heated to maintain a uniform temperature across the radial dimension of the column, as well as over the length thereof. Generally, the entire annular column, including the sample intake and effluent collecting manifolds and distribution conduits hereinbefore mentioned are enclosed within an insulated chamber and an air circulating device is positioned in the chamber in alignment with the column for circulating air around the column and through the opening through the center of the column. A suitable heating device is positioned in the path of the circulating air so that the air is heated to any desired temperature as determined by a temperature sensing element at the time of passage through the opening in the middle of the column.

In summary, the vapor phase chromatographic system of the present invention may be broadly described as comprising a generally cylindrical annular chromatographic column having, as is conventional, two concentric cylindrical walls defining an annular space therebetween for the accommodation of packing; a sample intake vapor manifold positioned above or over one end of the chromatographic column; a plurality or series of conduits which are connected between the sample intake vapor manifold and the chromatographic column so as to place the manifold in simultaneous communication with a plurality of points spaced circumferentially around the annular space of the column allowing vapor from the sample manifold to be introduced evenly to the upper end of the chromatographic column; an effluent collection vapor manifold positioned below the column; a series of conduits connected between the effluent collection vapor manifold and the lower end of the column and placing the vapor collection manifold in simultaneous communication with a plurality of points spaced circumferentially around the annular space in the column; access means positioned between the first series of conduits in the upper end of the column to permit access to be had to the column annulus for the purpose of introducing, removing, and replacing the packing therein; a casing enclosing the entire annular chromatographic column, both the sample and effluent manifolds, and the conduits connecting these manifolds to the column; an air circulating means positioned inside the casing adjacent one end of the column; a tubular air conveying means inside the casing enclosing one of the manifolds and connected between the air circulating means and the annular chromatographic column for circulating air around the enclosed manifold and through the column; and a suitable heating device positioned in the tubular air conveying means for heating the air which is circulated therethrough by the air circulating means.

From the foregoing description, it will be appreciated that the apparatus summarily described in the preceding paragraph may be effectively used for isolating good yields of relatively pure molecular species from a gaseous mixture containing such species. The invention thus achieves one of its major objects which is to improve the recovery and purity of the several components of a gaseous sample which is resolved into its several components using an annular chromatographic column.

A more specific object of the invention is to improve the uniformity with which a vapor or gaseous sample may be introduced to, and removed from, an annular vapor phase chromatographic column.

A further object of the present invention is to improve the ease and efficiency with which annular vapor phase chromatographic columns may be packed with a separatory packing material.

Yet another object of the present invention is to improve the temperature control available in an annular vapor phase chromatographic column.

Yet another object of the present invention is to provide a vapor phase chromatography system which is relatively inexpensive to construct, and is characterized by a long and trouble-free operating life.

Other objects and advantages will become apparent as the following detailed description of the invention is read in conjunction with a perusal of the accompanying drawings which illustrate our invention.

In the drawings:

FIGURE 2 is a sectional view taken along line 2—2 of FIGURE 1, showing the arrangement of sample inlets to the column.

FIGURE 3 is an enlarged, sectional view taken along line 3—3 of FIGURE 2, showing the manner in which the upper portion of the column is assembled.

FIGURE 4 is a vertical sectional view, in reduced scale, taken through the center of an elongated vertically extending casing which encloses the annular chromatographic column and sample intake and effluent collection manifolds, and illustrating the latter elements in elevation.

FIGURE 5 is a plan view of the chromatographic system illustrated in FIGURE 4, showing the position of a blower relative to the column.

Figure 1:
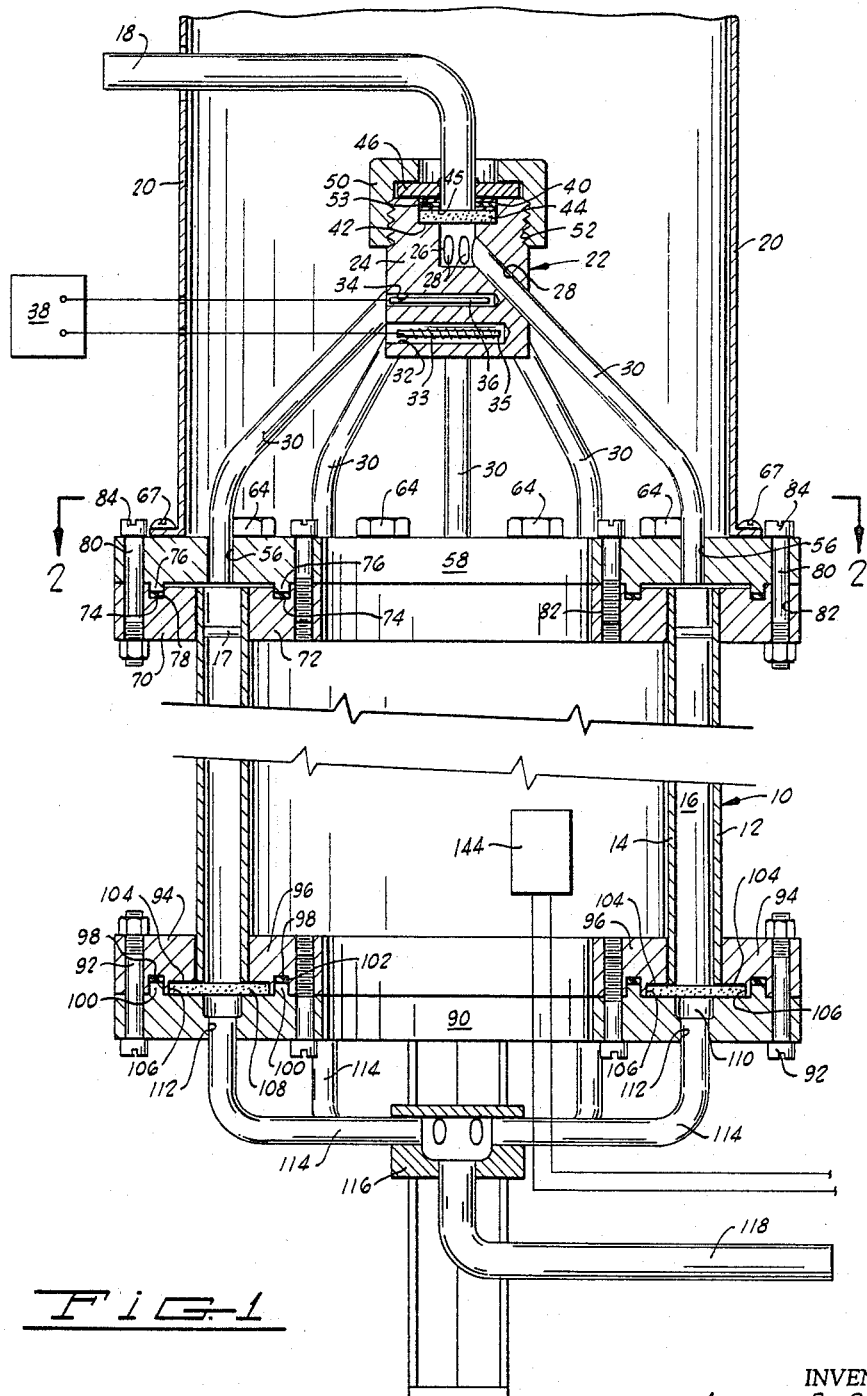
FIGURE 1 is a vertical sectional view through the center of the annular chromatographic column of the present invention. The sample intake manifold and its associated distributing conduits and also the effluent collection manifold and its distributing conduits are illustrated in elevation.

Referring now to the drawings in detail, and particularly, to FIGURE 1, the annular chromatographic column which is used in the system of the invention is designated generally by reference character 10. As in the conventional construction, the annular column comprises a pair of concentric metallic walls 12 and 14 which define an annular space 16 therebetween in which the column packing (not shown) is positioned. Radially extending spacer pins 17 are circumferentially spaced around the annular space 16 and function to maintain the spacing between the walls 12 and 14. The sample of gaseous material to be subjected to the chromatographic separatory effect of the packing material is introduced to the top of the annular space 16 and flows downwardly through the column 10 and is eluted at the bottom of the annular space.

In the chromatography system of the present invention, the sample, after being vaporized in a suitable vaporizing device (not seen) enters the chromatographic system through a sample delivery tube 18. The sample delivery tube passes through a generally cylindrical manifold housing 20 and enters a sample intake vapor manifold designated generally by reference character 22. The sample intake vapor manifold 22 comprises a manifold block 24 which is preferably constructed of steel or other heat conducting metal. The block 24 is provided with a bore 26 extending thereinto from one side thereof and with a plurality of ports 28 which receive a plurality of sample delivery conduits 30 in the manner illustrated in FIGURE 1.

The manifold block 24 is provided with a recess 32 in the lower portion thereof for accommodating or receiving a heating element 35 which is used to heat the block 24 for purposes hereinafter described. A temperature sensing element well 34 formed in the block 24 accommodates a temperature sensing element 36, such as a thermocouple or a thermometer, and the temperature sensing element 36 is connected through a suitable control device 38 positioned outside the manifold housing 20 for the purpose of controlling as desired the temperature to which the manifold block 24 is heated.

The bore 26 in the manifold block 24 communicates with a larger diameter counterbore 40 so that a flat surfaced shoulder 42 is formed internally in the block 24 for supporting a vapor permeable disc 44, such as a porous stainless steel disc. Spaced a short distance from the end 45 of the sample delivery tube 18 is an annular flange 46 which is secured around the sample delivery tube by welding, brazing, or other suitable method and is of larger diameter than the counterbore 40. The distance from the annular flange 46 to the end 45 of the sample delivery tube 18 is equal to, or slightly less than, the distance from the upper end of the block 24 to the upper surface of the vapor permeable disc 44. Thus, the sample delivery tube 18 may be brought into contact with the vapor permeable disc 44 and secured in position relative to the manifold block 24 by using an internally threaded, generally annular locknut 50 which engages an external thread 52 on the manifold block 24 and may be used to bias the annular flange 46 into flatly abutting contact with the upper end of the manifold block 24. A suitable sealing element, such as an O-ring or gasket 53, is positioned in the space between the annular flange 46 and the vapor permeable disc 42 and is dimensioned to undergo compression as the generally annular locknut 50 is threaded on the block 24.

It will thus be seen from the description of the sample receiving vapor manifold 22 that the gaseous sample entering the manifold from the sample delivery tube 18 is passed through the vapor permeable disc 42 and enters the several conduits 30 via the ports 28. The manifold block 24 is heated by the heating element 33 and conducts heat to the vapor permeable disc 42 so that the disc is relatively hot as the gaseous sample passes therethrough. The purpose of this arrangement will be subsequently described in describing the overall operation of the invention.

The lower ends of the conduits 30 are received in apertures 56 which extend axially through an annular lid designated by reference character 58. The annular lid 58 is dimensioned to provide a cover for the chromatographic column 10, and the apertures 56 which receive the conduits 30 are circumferentially spaced around the lid at substantially regular intervals. The apertures 56 are also radially positioned on the annular lid 58 so that they register with the annular space 16 in the chromatographic column 10 to place the sample receiving vapor manifold 22 in communication with such space via the conduits 30.

As will be perceived in referring to FIGURES 2 and 3 of the drawings, the annular lid 58 is also provided with a second series of circumferentially spaced openings or apertures 62 which are positioned on the same arc as the apertures 56. During the operation of the column, the apertures 62 are plugged or closed by suitable threaded plugs 64 using suitable O-rings or gaskets 66 to maintain the vapor integrity of the column when the plugs 64 are in position. The apertures 62 afford access to the annular space 16 of the column 10 for the purpose of adjusting, removing, or replacing the packing therein when it is inconvenient or undesirable to remove the annular lid 58 from the column. The housing 20 is secured to the annular lid 54 by suitable screws 67.

For the purpose of securing and indexing or positioning the annular lid 58 in place at the top of the chromatographic column 10, a pair of annular plates designated by reference characters 70 and 72 are secured around the upper end of the column. The annular plate 70 is characterized in having an inside diameter which is substantially equal to the outside diameter of the annular chromatographic column 10 and is secured around the column at the upper end thereof by welding, brazing, or other suitable means so that the space between the annular plate and the column is sealed against the loss of vapor from the column. The internal annular plate 72 has an outside diameter which is substantially equal to the inside diameter of the column 10 and is secured around the inside of the column at the upper end thereof similar to the method of securement of the outer annular plate 70. Each of the annular plates 70 and 72 is provided with an annular groove 74 extending therearound and adapted to receive a mating tongue or protuberance 76 on the annular lid 58. A suitable sealing member, such as an O-ring or gasket 78, is positioned in each of the grooves 74 to form a vapor tight seal between the annular lid 58 and the annular plates 70 and 72.

In order to tightly engage the annular lid 58 with the annular plates 70 and 72, a plurality of circumferentially spaced apertures 80 are formed through the annular lid adjacent both the inner and outer peripheries thereof, and when the system is assembled, such apertures register with apertures 82 formed in the annular plates 70 and 72 adjacent the outer and inner peripheries thereof, respectively. Suitable bolt means 84 are then passed through the registering apertures 80 and 82 to tightly retain the annular lid 58 in position on the annular plates 70 and 72. It will be observed that the interlock constituted by the grooves 74 and protuberances 76 function as an indexing or keying device to assure the alignment of the lower ends of the conduit 30 and their receiving apertures 56 with the annular space 16 in the column 10.

The arrangement at the lower end of the annular chromatographic column 10 is somewhat similar to the arrangement of the system at the upper end of the column. Thus, an annular base plate 90 is provided which is of sufficient width to extend across the annular space 16 of the column. The base plate 90 is secured in proper position relative to the column by the use of suitable bolt means 92 which extend through registering apertures in the annular base plate 90, and in a pair of annular plates 94 and 96 secured around the lower end of the column 10 at the outside and inside thereof, respectively. It will be noted that an interlock is again provided by grooves 98 formed in the annular plates 94 and 96 and mating protuberances 100 formed on the annular base plate 90. A suitable sealing member 102 is positioned in each of the grooves 98 to assure against vapor loss between the plates 94 and 96 and the annular base plate 90.

The annular plates 94 and 96 are each provided with a relieved portion adjacent the chromatographic column 10 with each of the relieved portions comprising an annular flat face 104 on the respective plate and in horizontal coplanar alignment with the lower end of the annular chromatographic column 10, and a shoulder 106 extending normal to the flat face and axially with respect to the chromatographic column. Positioned in the relieved portions of the annular plates 94 and 96 is a vapor permeable annular plate 108 which extends across the annular space 16 in the column 10 and provides a vapor permeable support for the packing material in the column. In a preferred embodiment of the invention, the annular base plate 90 is provided with an annular groove 110 which is positioned on the opposite side of the vapor permeable plate 108 from the annular space 16 and receives the gaseous components of the sample as they are eluted from the column. The annular base plate 90 is further provided with a series of circumferentially spaced apertures 112 which communicate with the annular groove 110 and receive a plurality of conduits 114. The conduits 114 converge to an effluent collecting vapor manifold 116 from which the collected vapors are discharged in a common effluent conduit 118.

For the purpose of controlling and varying as desired the temperature obtaining in the chromatographic column 10, the column is positioned in a heating chamber or jacket comprising a cylindrical casing 120 having a top portion 122 which is hinged to a bottom portion 124 in which the column 10 and its associated vapor manifolds 22 and 116 are located. The hinged cover portion 122 may, of course, be opened to allow access to the column 10 located in the lower portion 124. In a preferred embodiment of the invention, the casing 120 is lined with a suitable insulating material 126 to provide good thermal insulation from the surrounding atmosphere. The sample delivery tube 18 and common effluent discharge conduit 118 extend through the insulating material 126 and the lower portion 124 of the casing 120 to permit their connection to sample vaporizing equipment and a suitable detecting device or sample trap, respectively, neither of which has been illustrated in the drawings. These devices are standard equipment in chromatographic systems and are well understood in the art.

In the upper portion 122 of the casing 120, a centrifugal blower or other suitable air circulating device 130 is supported with its drive shaft 132 extending through the insulation 126 and upper portion 122 of the casing 120 for connection to a motor 133 (see FIGURE 5) located outside the casing 120. The discharge duct 134 of the blower 132 is connected to a tubular air conveying means 136 which conveys air from the blower 130 into the housing 20 around the sample receiving vapor manifold 22. The tubular air conveying means 136 encloses a suitable heating device 138 which is connected through electrical leads 140 to a temperaturer control device 142 located outside the casing 120 and further connected to a thermocouple or other suitable heat sensing element 144 located inside the space enclosed by the annular chromatographic column 10.

In the operation of the heating system used in the invention, the centrifugal blower 130 impels air through the tubular air conveying means 136 where it is heated to the extent desired by the heating device 138. The air is then forced downwardly around the vapor manifold 22 and into the space or opening through the annular chromatographic column. The air moves from the upper to the lower end of the column 10 and then passes out into the annular space between the external wall 12 of the column and the casing 120. As the air moves upwardly past the column, it effectively heats the external wall 12 of the column to substantially the same extent that the internal wall 14 thereof has been heated. Ultimately, the air reaches the blower 130 and is then recirculated over the path described. In having the motor 133 mounted outside the casing 120, the bearings of the motor are protected from the heat within the casing 120 and the motor is more easily accessible to operating personnel.

The circulating air heating assembly described is a very efficient method of heating both the inside and outside walls of the annular chromatographic column so that a relatively uniform temperature is achieved in the column, both in a radial direction and in a longitudinal direction. Moreover, the use of the circulating air for heating the column avoids the development of hot spots which frequently occur in the column when helical heating elements of the resistance or radio frequency type are employed.

*Overall operation of the chromatographic system of the invention*

At the outset of the use of the chromatographic system of the present invention, the annular column 10 is packed with the type of packing material which it is desired to use in effecting a particular separation of components. The packing of the column may be accomplished either through the apertures 62 following removal of the plugs 64 therefrom, or it may be effected by removing the annular lid 58 from the column and inserting the packing at the top of the annular space 16 which is then accessible.

After the packing material has been placed in the column 10, the lid 58 is replaced. A sample comprising a gaseous mixture of compounds to be separated by the column 10 is then passed through the sample delivery tube 18 to the sample intake vapor manifold 22. Upon reaching the manifold 22, the vapor sample passes through the vapor permeable disc 44 and into the bore 26. The permeable disc 44 is heated to an elevated temperature by contact with the manifold block 24, and the high temperature of the diaphragm coupled with the small pore size of the openings therethrough insures the vaporization of the sample passed therethrough. In other words, the large surface area over which the sample passing through the diaphragm 44 contacts the diaphragm material, coupled with the high temperature of the diaphragm, results in any liquid which may be entrained in the sample being vaporized and also prevents a tendency toward condensation of any of the components in the vapor sample.

After the gaseous mixture enters the bore 26 of the manifold 22, the sample is distributed into the several conduits 30 and passes therethrough to the apertures 56 formed in the annular lid 58. Due to the alignment of the apertures 56 with the annular space 16 is in the chromatographic column 10, the sample passing through the apertures is directed into the annular space 16 at a plurality of circumferentially spaced points therearound and thus proceeds with an even frontal movement down the length of the column 10.

As the sample moves through the chromatographic column 10, it is separated or resolved by the packing therein in the manner hereinbefore described. Thus, the components of the mixture which are more strongly adsorbed on the packing material move more slowly through the column, while those which have a lesser mutual affinity for the packing material move more rapidly through the column and are eluted from the lower end thereof prior to the slower moving components. In this manner, separation of the components is achieved.

Upon reaching the lower end of the column 10, the components of the gaseous sample pass through the annular, vapor permeable plate 104 into the annular groove 110. The function of the permeable plate 104 is to provide a firm support for the packing material but offer a minimum resistance to the free passage of the gaseous components of the sample therethrough.

From the annular groove 110, the sample is passed through the several discharge conduits 114 to the effluent collecting vapor manifold 116. From this manifold, the collected components are passed into the conduit 118 in the order of their elution from the column 10. The resolved components of the mixture flowing in the conduit 118 may then be recovered by trapping out the desired component in a cold trap (not shown), and alternatively or simultaneously, the components, or a portion thereof, may be passed through a suitable detecting instrument, such as a thermal conductivity cell, in order to graphically record the quantity of component present, and also to identify its particular chemical character. It has been observed that the use of the system of the present invention results in an improvement in the uniformity and therefore purity of the resolved components eluted from the column 10 in that the peaks inscribed on a continuous strip chart recorder and representative of the quantity and quality of the particular component eluted from the column are more symmetrical and uniform than such peaks as they were previously recorded using annular chromatographic columns in which the sample was charged to the column at a single point on the side thereof, and received from the column also at a single collection point.

The heating system used in the invention can be employed to elevate the temperature of the packing in the column to a substantially uniform higher temperature throughout the bed of the packing in both a radial and an axial direction. As has previously been explained, the value of such uniformity of heating, and the degree of heating control which is attainable using the system described results in a more uniform and even flow of the components of the gaseous mixture through the column, and further improves the purity and quantity of component recovery obtainable when using the column for the preparation of large quantities of pure components.

Figure 6:
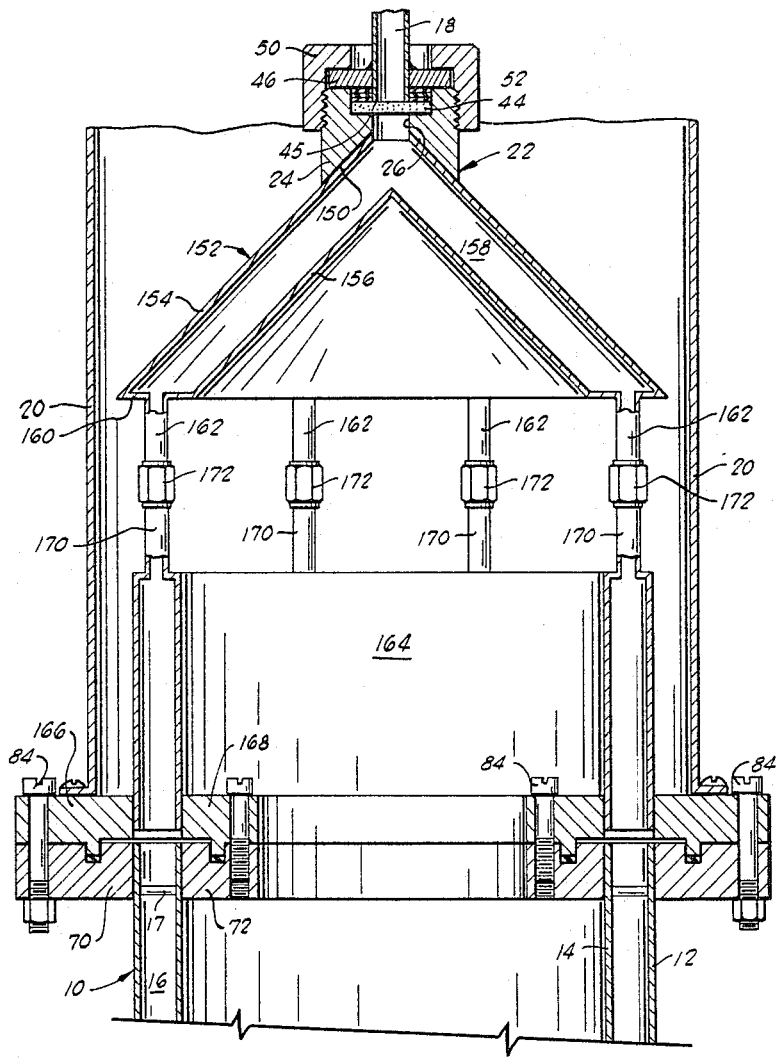
FIGURE 6 is a sectional view similar to FIGURE 1 and illustrating a portion of a modified embodiment of the invention.

An alternative embodiment of the present invention which may be employed is illustrated in FIGURE 6 of the drawings. Since some of the components of the embodiment of the invention illustrated in FIGURE 6 are identical to those employed in the embodiment shown in FIGURE 1, identical reference numerals have been utilized to identify these components. The manifold block 24 of sample inlet vapor manifold 22 is provided with a generally conically shaped recess 150 which communicates with the bore 26 and is configured to receive the apex of a conical hood designated generally by reference character 152. The conical hood 152 comprises a pair of parallel, conically shaped walls 154 and 156 which define between them a conically shaped space 158. The conical hood 152 is open at its apex so that the conically shaped spaced 158 is placed in communication with the bore 26 in the manifold block 24. The lower end of the conical hood 152 is closed by an annular plate 160, and a plurality of conduits 162 are circumferentially spaced around the annular plate 160 and communicate with the annular space 158. A generally cylindrical, double walled member 164 is secured between a pair of annular plates 166 and 168 and carries at its upper end a plurality of conduits 170 which are aligned with the conduits 162 and coupled thereto by suitable threaded connecting members 172. The annular plates 166 and 168 are bolted to the annular plates 70 and 72 secured to the upper end of the chromatographic column 10 in substantially the same way that the annular lid 58 in the embodiment illustrated in FIGURE 1 is bolted thereto. The entire assembly illustrated in FIGURE 6 may be placed in the casing 120 and heated by the same heating apparatus illustrated in FIGURE 4.

It will be perceived that the operation of the embodiment shown in FIGURE 6 of the drawings is generally similar to that shown in FIGURES 1 through 4. The vaporized sample enters the sample intake vapor manifold 22 through the delivery tube 18. After passing through the permeable disc 44, the gaseous sample passes through the conical hood 152 into the conduits 162. From the conduits 162, the vapor passes through the conduits 170 and into the double walled cylindrical member 164. Within the double walled cylindrical member 164, the gaseous sample distributes itself evenly around the annular space inside the cylindrical member 164 and thus enters the chromatographic column 10 in an even manner around the entire periphery thereof.

It may be seen that when the embodiment illustrated in FIGURE 6 is utilized, the chromatographic column 10 may be easily packed either by disconnecting the connecting members 172 and introducing the packing through the conduits 170, or by removing the double walled cylindrical member 164 from the top of the column and passing the packing material into the column directly through the open upper end of the annular space 16.

From the foregoing description of the invention, it will be apparent that the chromatographic system of the present invention achieves highly efficient resolution of the several components of a gaseous mixture introduced to the column. The means of temperature control used in the system effectively heats the column at both the inside and outside wall, and maintains an even temperature throughout the column. Also, the chromatographic column used in the system may be more easily packed and cleaned than in previously existing systems employing an annular chromatographic column.

Although a number of modifications and innovations in the structural details of the invention may be made by those skilled in the art, it is to be understood that the structure which has been hereinbefore described is merely illustrative of two forms among many which the invention may take without departure from the principles underlying the invention. It is therefore intended that insofar as changes and modifications made by those skilled in the art do not depart from an employment of the fundamental principles underlying the invention, such modifications and changes shall be encompassed by the spirit and scope of the invention except as the same may be necessarily limited by the appended claims.

What is claimed is:
1. A vapor phase chromatography system comprising:
 (a) a generally cylindrical annular chromatographic column having two concentric cylindrical walls defining an annular space therebetween and having a first end and a second end;
 (b) a first vapor manifold means spaced from one end of said annular column;
 (c) a sample delivery tube entering said first manifold means for delivering a vaporized sample to said manifold means;
 (d) a plurality of first conduits connected between said first vapor manifold means and said one end of said annular chromatographic column and placing said manifold means in simultaneous communication through said first conduits with the annular space of said column at points spaced circumferentially around said annular space at one end thereof whereby vapor from said manifold means may be introduced evenly to said one end of the column;
 (e) a second vapor manifold means spaced from the other end of said column; and
 (f) a plurality of second conduits connected between said second vapor manifold means and the other end of said chromatographic column and placing said second manifold means in simultaneous communication through said second conduits with the other end of said annular space at points spaced circumferentially around said annular space whereby vapor may be received evenly from said other end of said chromatographic column and collected in said second manifold means.

2. A vapor phase chromatography system as defined in claim 1 wherein said first vapor manifold means comprises:
 (a) a manifold block having a bore extending at least part of the way through said block at one side thereof;
 (b) duct means placing said bore in communication with each of said first conduits;
 (c) a vapor permeable disc in said block across said bore; and
 (d) means for securing said sample delivery tube in said bore with its end adjacent said disc for discharging vapor through said disc into said first conduits.

3. A vapor phase chromatography system as defined in claim 2 wherein said disc contacts said block around the bore therein, said block is of a heat conductive metal construction and has a recess formed therein, and wherein said first vapor manifold means further includes a heating element in said recess for heating said block and the vapor permeable disc in contact therewith.

4. A vapor phase chromatography system as defined in claim 2 wherein said duct means comprises a plurality of ports in said block communicating with said bore and each receiving one of said first conduits.

5. A vapor phase chromatography system as defined in claim 2 wherein said duct means comprises a double walled hood open at a first end and having an annular plate closing an annular space between the walls of said hood at a second end thereof, said plate having a plurality of circumferentially-spaced apertures therein each receiving one of said first conduits, and wherein said block has a recess therein communicating with said bore and registering with the first end of said hood.

6. A vapor phase chromatography system as defined in claim 2 wherein a portion of said block around said bore is externally threaded and wherein said securing means comprises:
(a) a flange of larger diameter than said bore and secured around said sample delivery tube;
(b) a generally annular locknut around said delivery tube on the opposite side of said flange from the end of the delivery tube adjacent said disc, said locknut having an internally threaded, axially extending annular portion engageable with the external threads on said block for biasing said flange into contact with said block across said bore; and
(c) a deformable sealing member around the end of the delivery tube and abutting said flange and dimensioned to form a seal between said delivery tube and the walls of said bore when said flange contacts said block across said bore.

7. A vapor phase chromatography system as defined in claim 3 wherein said block is provided with a temperature sensing element well and wherein said first vapor manifold means further includes
(a) a temperature sensing element in the well in said block; and
(b) temperature control means connected between said temperature sensing element and heating element to control the temperature to which said block is heated.

8. A vapor phase chromatography system as defined in claim 1 and further characterized to include:
(a) a casing enclosing said annular chromatographic column, first and second manifold means and first and second conduits;
(b) air circulating means positioned inside said casing and spaced from one end of said annular chromatographic column;
(c) air conveying means inside said casing enclosing one of said manifold means and connected between said air circulating means and said annular chromatographic column for circulating air around said enclosed manifold means and through the innermost of said two cylindrical walls to the end of said column opposite said air circulating means; and
(d) heater means positioned in said air conveying means for heating air circulated therethrough by said air circulating means.

9. A vapor phase chromatography system as claimed in claim 8 and further characterized to include:
(a) a motor positioned outside said casing; and
(b) a shaft extending through said casing and drivingly connecting said air circulating means to said motor.

10. A vapor phase chromatography system as defined in claim 8 and further characterized to include:
(a) temperature sensing means positioned inside the innermost of said two concentric cylindrical walls; and
(b) temperature control means connected between said temperature sensing means and said heater means for controlling the extent to which said circulated air is heated by said heater means.

11. A vapor phase chromatography system as defined in claim 1 and further characterized to include:
(a) an annular lid dimensioned to cover the annular space in said annular chromatographic column and having a plurality of circumferentially spaced apertures therein receiving one of the ends of each of said first conduits; and
(b) indexing and securing means for positioning said annular lid over said annular space and securing said lid to said column with the apertures in said lid aligned with said annular space.

12. A vapor phase chromatography system as defined in claim 11 wherein said annular lid is further characterized in having a plurality of additional apertures extending therethrough and aligned with the annular space of said chromatographic column; and
a plurality of removable plugs sealing said apertures and removable to permit access to said annular space at a plurality of points therearound.

13. A vapor phase chromatography system as defined in claim 11 wherein said annular lid is wider in its radial dimension than the annular space in said annular chromatographic column and is provided with circumferentially spaced, axially extending apertures adjacent the inner and outer periphery of said lid, and wherein said indexing and securing means comprises:
(a) a first annular plate having an inside diameter substantially equal to the outside diameter of said annular chromatographic column and sealingly secured around said column at said one end thereof in sealing engagement therewith, said first annular plate having a plurality of apertures extending axially therethrough and spaced circumferentially around said plate and positioned for registry with the apertures extending through said annular lid adjacent the outer periphery thereof;
(b) a second annular plate having an outside diameter substantially equal to the inside diameter of said annular chromatographic column and sealingly secured around the inside of said column at said one end thereof in horizontal alignment with said first annular plate, said second annular plate having a plurality of circumferentially spaced apertures extending axially therethrough and positioned for registry with the apertures through said annular lid and adjacent the inner periphery thereof; and
(c) bolt means extending through the several pairs of registering apertures for bolting said annular lid across said annular space in abutting contact with said first and second annular plates.

14. A vapor phase chromatography system as defined in claim 1 and further characterized to include:
(a) an annular base dimensioned to cover the annular space in said annular chromatographic column and having a plurality of circumferentially spaced apertures therein receiving one of the ends of each of said second conduits; and
(b) indexing and securing means for positioning said annular base over said annular space and securing said base to said column with the apertures in said base aligned with said annular space.

15. A vapor phase chromatography system as defined in claim 14 wherein said annular base is wider in its radial dimension than the annular space in said annular chromatographic column and is provided with circumferentially spaced apertures extending axially therethrough adjacent the inner and outer periphery thereof, and wherein said indexing and securing means comprises:
(a) a first annular plate having an inside diameter substantially equal to the outside diameter of said annular chromatographic column and secured around said annular chromatographic column at said other end thereof in sealing engagement therewith, said first annular plate having a plurality of apertures extending axially therethrough and spaced circumferentially around said plate and positioned for registry with the apertures through said annular base and adjacent the outer periphery thereof;

(b) a second annular plate having an outside diameter substantially equal to the inside diameter of said annular chromatographic column and secured inside said column at said other end thereof in horizontal alignment with said first annular plate, said second annular plate having a plurality of circumferentially spaced apertures extending axially therethrough and positioned for registry with the apertures through said annular base and adjacent the inner periphery thereof; and (c) bolt means for bolting said annular base across said annular space in abutting contact with said first and second annular plates.

16. A vapor phase chromatography system as defined in claim 13 and further characterized to include sealing means between said annular lid and each of said first and second annular plates for precluding vapor leakage between said plates.

17. A vapor phase chromatography system as defined in claim 15 and further characterized to include a vapor permeable annular plate positioned between said annular base and said first and second annular plates across said annular space for supporting the column packing in said annular space and permitting vapor to flow from said column to said second manifold means via said second conduits.

18. A vapor phase chromatography system as defined in claim 15 wherein said annular base is provided with an annular groove therein communicating with the apertures receiving said second conduits and positioned on the opposite side of said annular base from said second conduits;

and wherein said first and second annular plates are each characterized in having a relieved portion adjacent said chromatographic column, said relieved portions each comprising:

(a) an annular flat face on the respective plates in horizontal coplanar alignment with said other end of said annular column; and (b) an annular shoulder extending normal to said flat face and axially with respect to said column, the relieved portions on said annular plates together defining an annular recess; and (1) a vapor permeable annular plate positioned in said annular recess across the annular space in said column and across the annular groove in said annular base for supporting packing in said column and permitting vapor to pass from said column through said second conduits to said second vapor manifold means.

19. A vapor phase chromatography system comprising:

(a) an annular column having two concentric cylindrical walls defining an annular space therebetween;

(b) means including a plurality of pipes in fixed relationship to said annular column for simultaneously introducing substantially equal quantities of a gaseous sample to one end of the column at a plurality of points spaced circumferentially around said annular space; and (c) means for simultaneously removing substantially equal quantities of a gaseous sample from the other end of said column at a plurality of points spaced circumferentially around said annular space.

20. A vapor phase chromatography apparatus comprising (a) an annular chromatographic column having inner and outer concentric walls defining an annular space therebetween, having an axial passageway therethrough and having a first end and a second end;

(b) sample distributing means including a plurality of pipes secured at said first end of the column in fixed relation to said column for introducing a gaseous sample uniformly to the column simultaneously to all points on said first end;

(c) sample collecting means secured at said second end of the column for removing a gaseous sample therefrom; and (d) means communicating with the axial passageway and responsive to the temperature therein for supplying thermal energy to said column, whereby the temperature of a sample within said column is controlled from said distributing means to said collecting means.

21. Apparatus as defined in claim 20 wherein said distributing means includes means for supplying thermal energy to said sample prior to the introduction of said sample into said column.

References Cited by the Examiner
UNITED STATES PATENTS

| | | | |
|---|---|---|---|
| 3,053,077 | 9/1962 | Tracht | 73—23.1 |
| 3,062,037 | 11/1962 | Donner et al. | 73—23.1 |
| 3,077,103 | 2/1963 | Heaton | 55—67 X |
| 3,187,486 | 6/1965 | Dinelli et al. | 55—67 |

REUBEN FRIEDMAN, *Primary Examiner.*